Oct. 9, 1934.    H. FURMAN    1,975,838
SMOKING PIPE
Filed Oct. 10, 1932
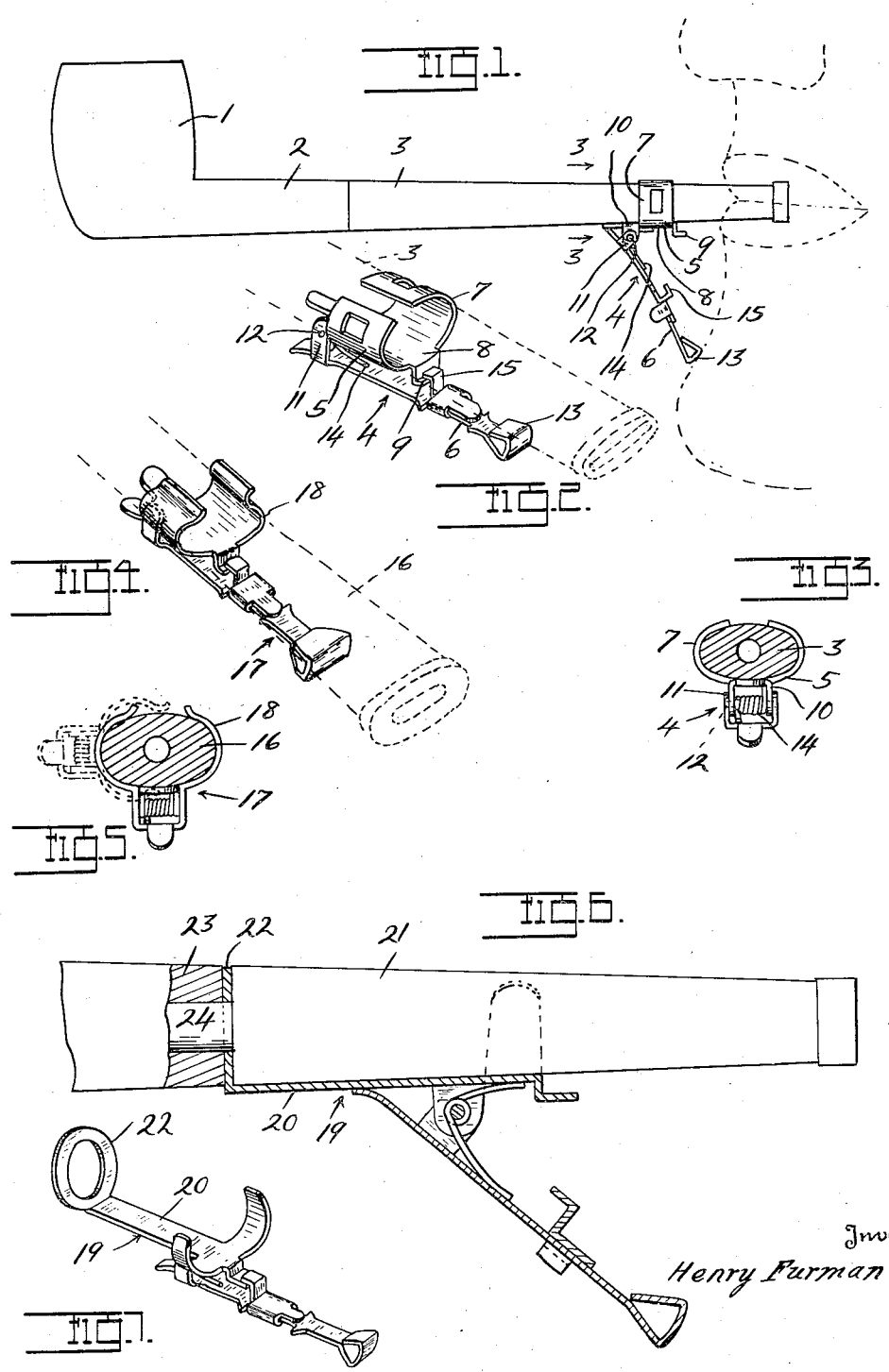
Inventor
Henry Furman.

Patented Oct. 9, 1934

1,975,838

UNITED STATES PATENT OFFICE 1,975,838

SMOKING PIPE

Henry Furman, Detroit, Mich.

Application October 10, 1932, Serial No. 637,174

12 Claims. (Cl. 131—12)

The invention relates to smoking pipes and has for one of its objects to provide an improved construction of chin rest to assist in supporting the pipe. Other objects are to so construct the chin rest that it may be readily attached to the pipe; to so construct the chin rest that it may occupy either an operative position or an inoperative position; and to so construct the chin rest that it may be manufactured at relatively low cost.

These and other objects of the invention will become apparent from the following description, taken in connection with the accompanying drawing, in which Figure 1 is a side elevation of a smoking pipe showing an embodiment of my invention;

Figure 2 is a perspective view of a portion thereof;

Figure 3 is a cross section on the line 3—3 of Figure 1 and showing the chin rest in inoperative position;

Figure 4 is a view similar to Figure 2 showing another embodiment of my invention;

Figure 5 is a view similar to Figure 3 showing the chin rest of Figure 4;

Figure 6 is a sectional elevation showing another embodiment of my invention;

Figure 7 is a perspective view of the chin rest of Figure 6.

As shown in Figures 1, 2 and 3, 1 is the bowl, 2 the shank and 3 the stem of the pipe and 4 is the chin rest. This chin rest comprises the clip 5 and the leg 6 connected to the clip. The clip is preferably formed of sheet metal and has the resilient curved arms 7 which are adapted to embrace the pipe stem 3 and to be engaged therewith by movement longitudinally thereover. The clip also has the base 8 between the arms and provided at its end nearest the free end of the pipe stem with the tongue 9 spaced downwardly from the pipe stem. The base has near its other end the ears 10 depending from its opposite side edges. The leg 6 is also preferably formed of sheet metal and has the ears 11 extending upwardly from its opposite side edges and adapted to embrace the ears 10. These ears are pivotally connected together by the pivot pin 12 extending therethrough. The free end of the leg is preferably return-bent to provide the chin engaging portion 13.

To normally hold the leg in operative position to engage the chin, I have provided the spring 14 which encircles the pivot pin 12 between the ears 10 and has one end engaging the leg 6 and the other end engaging the base 8 of the clip. This coil spring yieldably forces the leg away from the base in a counter clockwise direction and holds the leg at an angle to the base or pipe stem determined by the engagement of the ends of the leg and base near the pivot pin 12 contacting with each other. To hold the leg in inoperative position or in a position extending substantially parallel to the base of the clip or the pipe stem, I have provided the catch 15 which embraces the leg 6 and is mounted thereon and is engageable with the tongue 9.

Figures 4 and 5 disclose another modification in which the pipe stem 16 flares outwardly toward its free end and in which the chin rest 17 differs essentially from the chin rest 4 in that the resilient arms 18 of the clip are return-bent at their free edges to facilitate mounting the chin rest upon the pipe stem by moving the arms over the upper and lower faces of the pipe stem and then rotating the chin rest to bring its leg below the pipe stem, at which time the arms engage the side faces thereof.

Figures 6 and 7 disclose another modification in which the clip 19 differs from the clips of the previous modifications in that its base 20 extends to the inner end of the pipe stem 21 and has the annulus 22 which is adapted to be clamped between the pipe stem and the bowl shank 23. This annulus encircles the reduced portion 24 of the pipe stem which extends into the bowl shank. The remainder of the construction is substantially the same as that previously described.

What I claim as my invention is:

1. The combination of a pipe and a chin rest, comprising a clip mounted upon the pipe stem, a leg pivotally connected to said clip and having a chin engaging portion, cooperating means upon said clip and leg for holding said leg in inoperative position beside the pipe stem, and means for normally holding said leg in operative position.

2. The combination of a pipe and a chin rest, comprising a clip attachable to and engaging the pipe stem, a leg pivoted to said clip and having a chin engaging portion, means for yieldably holding said leg in operative position, and cooperating means upon said clip and leg for holding said leg in inoperative position beside the pipe stem.

3. The combination of a pipe and a chin rest, comprising a clip embracing the pipe stem, a leg having a chin engaging portion, a pivot element connecting said clip and leg, a spring encircling said pivot element, and normally holding said leg at an angle to the stem of said pipe and in operative position, and cooperating means upon said clip and leg for holding said leg substantially parallel to the pipe stem and in inoperative position.

4. The combination of a pipe and a chin rest, comprising a clip having resilient arms embracing the pipe stem, a leg having a chin engaging portion, said leg being connected to said clip and normally extending at an angle to the pipe stem, and cooperating means upon said clip and leg for holding said leg substantially parallel to the pipe stem.

5. The combination of a pipe and a chin rest, comprising a clip mounted upon the pipe stem, a leg pivoted to said clip and having a chin engaging portion, means for yieldably holding said leg at an angle to the pipe stem, and means movably mounted upon said leg and engageable with said clip for holding said leg substantially parallel to the pipe stem.

6. The combination of a pipe and a chin rest, comprising a clip mounted upon the pipe stem, a leg pivoted to said clip and having a chin engaging portion, means for yieldably holding said leg at an angle to the pipe stem, and a catch longitudinally slidably mounted upon said leg and engageable with said clip for holding said leg substantially parallel to the pipe stem.

7. The combination of a pipe and chin rest, comprising a clip embracing the pipe stem, a leg having a chin engaging portion, said leg being connected to said clip and normally extending at an angle to the pipe stem, and a member movably mounted upon said leg and engageable with said clip to hold said leg substantially parallel to the pipe stem.

8. The combination of a pipe and a chin rest, comprising a clip having resilient arms engaging the pipe stem and a base between said arms and provided with a tongue, a leg pivoted to said base, spring means for normally holding said leg at an angle to said base, and a catch slidably mounted upon said leg and engageable with said tongue to hold said leg substantially parallel to said base.

9. The combination of a pipe having a shank and a stem abutting said shank and provided with a reduced portion extending into said shank and a chin rest, comprising a clip having a base, resilient arms mounted upon said base embracing the pipe stem, an annulus upon said base encircling the reduced portion of the pipe stem and located between the shank and pipe stem, and a leg upon said base normally extending at an angle thereto.

10. The combination of a pipe and a chin rest, comprising a clip embracing the pipe stem, a leg having a chin engaging portion, a pivot element connecting said clip and leg, means for yieldably holding said leg at an angle to said clip, and cooperating means upon said clip and leg for determining the relative angle between said leg and clip.

11. The combination of a pipe and a chin rest, comprising a base member secured to the pipe stem, a leg member having a chin engaging portion, said leg member being connected to said base member to move angularly from an inoperative position beside the pipe stem to an operative position at an angle to the pipe stem, and cooperating means on said base member and leg member for holding said leg member in inoperative position, said means comprising an element movably mounted on one of said members.

12. The combination of a pipe and a chin rest, comprising a base member secured to the pipe stem, a leg member having a chin engaging portion, said leg member being connected to said base member to move angularly from an inoperative position beside the pipe stem to an operative position at an angle to the pipe stem, and cooperating means on said base member and leg member for holding said leg member in inoperative position, said means comprising a tongue on one of said members and a catch movably mounted on the other.

HENRY FURMAN.